(12) United States Patent
Kulikowski

(10) Patent No.: US 11,451,541 B2
(45) Date of Patent: Sep. 20, 2022

(54) DEVICE AND METHOD FOR CONNECTING A PRODUCTION DEVICE TO A NETWORK

(71) Applicant: secunet Security Networks Aktiengesellschaft, Essen (DE)

(72) Inventor: Jens Kulikowski, Oberding (DE)

(73) Assignee: SECUNET SECURITY NETWORKS AKTIENGESELLSCHAFT, Essen (DE)

( * ) Notice: Subject to any disclaimer, the term of this patent is extended or adjusted under 35 U.S.C. 154(b) by 48 days.

(21) Appl. No.: 16/064,619

(22) PCT Filed: Dec. 20, 2016

(86) PCT No.: PCT/EP2016/002141
§ 371 (c)(1),
(2) Date: Jun. 21, 2018

(87) PCT Pub. No.: WO2017/108177
PCT Pub. Date: Jun. 29, 2017

(65) Prior Publication Data
US 2019/0007407 A1     Jan. 3, 2019

(30) Foreign Application Priority Data
Dec. 22, 2015   (DE) .......................... 102015016616.6

(51) Int. Cl.
*H04L 9/40* (2022.01)
*H04L 69/08* (2022.01)
(Continued)

(52) U.S. Cl.
CPC .......... *H04L 63/0876* (2013.01); *G07D 11/28* (2019.01); *H04L 9/3234* (2013.01);
(Continued)

(58) Field of Classification Search
CPC ... H04L 63/0876; H04L 43/02; H04L 43/028; H04L 43/04; H04L 43/06; H04L 43/00;
(Continued)

(56) References Cited

U.S. PATENT DOCUMENTS

| 5,796,721 A | 8/1998 | Gretta, Jr. |
| 5,802,320 A | 9/1998 | Baehr et al. |

(Continued)

FOREIGN PATENT DOCUMENTS

| DE | 102009040419 A1 | 4/2011 |
| DE | 102012024397 A1 | 6/2014 |
| EP | 2381377 A1 | 10/2011 |

OTHER PUBLICATIONS

German Search Report from DE Application No. DE 10 2015 016 616.6, dated Dec. 15, 2016.
(Continued)

*Primary Examiner* — Kambiz Zand
*Assistant Examiner* — Mahabub S Ahmed
(74) *Attorney, Agent, or Firm* — Workman Nydegger

(57) ABSTRACT

An apparatus for connecting a data-processing and/or data-generating production apparatus with a network includes a first network interface to be connected with the network, a second network interface to be connected with the production apparatus, and a program code stored in the memory for execution by the at least one processor. The program code includes instructions upon whose execution data packets received at the second network interface via a second protocol are forwarded to the first network interface, and/or upon whose execution data packets received at the first network interface via a first protocol are forwarded to the second network interface and there are sent via a second protocol to the production apparatus. The program code includes instructions upon whose execution the at least one
(Continued)

processor applies a packet filter to the data packets on the way between the network interfaces.

20 Claims, 4 Drawing Sheets

(51) Int. Cl.
  *H04L 69/18*     (2022.01)
  *G07D 11/28*     (2019.01)
  *H04L 9/32*      (2006.01)
  *H04L 43/028*    (2022.01)
  *H04L 67/00*     (2022.01)
  *H04L 12/40*     (2006.01)

(52) U.S. Cl.
  CPC ............ *H04L 43/028* (2013.01); *H04L 67/34* (2013.01); *H04L 69/08* (2013.01); *H04L 69/18* (2013.01); *H04L 2012/4026* (2013.01)

(58) Field of Classification Search
  CPC ......... H04L 9/3234; H04L 9/32; H04L 67/34; H04L 69/02–18; H04L 2012/4026; G07D 11/28
  USPC .............................................................. 726/4
  See application file for complete search history.

(56) References Cited

U.S. PATENT DOCUMENTS

| | | | | | |
|---|---|---|---|---|---|
| 5,852,660 | A * | 12/1998 | Lindquist | ............. | H04Q 3/0025 370/467 |
| 6,047,002 | A * | 4/2000 | Hartmann | ................. | H04L 9/40 370/395.6 |
| 6,111,893 | A * | 8/2000 | Volftsun | ................... | H04Q 3/62 370/467 |
| 6,400,729 | B1 * | 6/2002 | Shimadoi | ................ | H04L 69/32 370/469 |
| 6,400,730 | B1 * | 6/2002 | Latif | ..................... | H04L 69/169 370/466 |
| 6,549,937 | B1 * | 4/2003 | Auerbach | ............ | H04L 51/066 709/206 |
| 6,678,535 | B1 * | 1/2004 | Narayanaswami | ..... | H04L 69/08 370/466 |
| 6,775,285 | B1 * | 8/2004 | Moles | ................... | H04W 12/35 455/445 |
| 7,912,046 | B2 * | 3/2011 | Li | ...................... | H04L 61/2514 709/227 |
| 8,146,149 | B2 * | 3/2012 | Steinkogler | ........... | H04L 63/145 726/16 |
| 8,454,440 | B2 * | 6/2013 | Brosnan | .................. | H04L 69/08 463/16 |
| 8,695,066 | B1 * | 4/2014 | Clark | ...................... | H04L 67/01 726/4 |
| 9,021,134 | B1 * | 4/2015 | Patel | ....................... | H04L 67/56 709/246 |
| 9,846,670 | B2 * | 12/2017 | Rohrl | ................... | G06F 13/4221 |
| 10,609,029 | B2 * | 3/2020 | Leconte | .................. | H04L 63/02 |
| 11,080,752 | B2 * | 8/2021 | Chudaitov | ......... | G06Q 30/0265 |
| 2002/0083344 | A1 * | 6/2002 | Vairavan | ............. | H04L 63/0227 726/13 |
| 2002/0160790 | A1 * | 10/2002 | Schwartz | .............. | H04L 69/329 707/E17.121 |
| 2003/0023795 | A1 * | 1/2003 | Packwood | .............. | H04L 69/18 710/105 |
| 2003/0046404 | A1 * | 3/2003 | O'Neill | ................. | H04L 67/563 709/228 |
| 2003/0051155 | A1 | 3/2003 | Martin | | |
| 2003/0074473 | A1 * | 4/2003 | Pham | ....................... | H04L 9/40 709/230 |
| 2003/0200325 | A1 * | 10/2003 | Krishnaswamy | ..... | H04L 69/329 709/230 |
| 2004/0215828 | A1 * | 10/2004 | Li | ............................ | H04L 69/08 709/246 |
| 2004/0252692 | A1 * | 12/2004 | Shim | .................... | H04L 12/1403 370/428 |
| 2005/0106941 | A1 * | 5/2005 | Witchey | ................ | H04L 69/167 439/620.09 |
| 2005/0175031 | A1 * | 8/2005 | Harley | ................. | H04L 63/0428 370/466 |
| 2006/0168247 | A1 * | 7/2006 | Hunneyball | ............ | H04L 69/08 709/228 |
| 2006/0184632 | A1 * | 8/2006 | Marino | ................. | G06F 3/0679 709/227 |
| 2007/0067458 | A1 * | 3/2007 | Chand | .................... | G06F 16/258 709/226 |
| 2007/0153813 | A1 * | 7/2007 | Terpstra | .............. | H04L 67/1001 370/401 |
| 2007/0195719 | A1 * | 8/2007 | Binder | ..................... | H04B 3/54 370/282 |
| 2007/0226318 | A1 * | 9/2007 | Rydberg | ................. | H04L 69/08 709/218 |
| 2008/0040788 | A1 * | 2/2008 | Steinkogler | ............. | H04L 63/02 709/249 |
| 2008/0247541 | A1 * | 10/2008 | Cholas | .................... | H04L 69/08 709/249 |
| 2008/0259932 | A1 * | 10/2008 | Gabriel | .................... | H04L 69/18 370/395.5 |
| 2009/0190585 | A1 * | 7/2009 | Allen | ...................... | H04L 69/08 370/389 |
| 2010/0177786 | A1 * | 7/2010 | Signaoff | .................. | H04L 69/18 370/466 |
| 2011/0302481 | A1 * | 12/2011 | Calvignac | ............... | H04L 69/08 370/466 |
| 2012/0106441 | A1 * | 5/2012 | Juneja | ..................... | H04L 69/14 370/328 |
| 2012/0140772 | A1 * | 6/2012 | Chu | ...................... | H04L 12/4641 370/392 |
| 2013/0177028 | A1 * | 7/2013 | Lebizay | .................. | H04L 69/08 370/466 |
| 2013/0246640 | A1 * | 9/2013 | Ahrens | ............... | H04L 65/1069 709/228 |
| 2014/0006639 | A1 * | 1/2014 | Wing | ................... | H04L 61/2575 709/242 |
| 2014/0254647 | A1 * | 9/2014 | Stott | ....................... | H04L 41/24 375/224 |
| 2015/0067188 | A1 * | 3/2015 | Chakhaiyar | ............. | H04L 69/18 709/232 |
| 2015/0229638 | A1 * | 8/2015 | Loo | ....................... | H04L 67/141 726/11 |
| 2015/0317268 | A1 | 11/2015 | Rohrl et al. | | |
| 2016/0043549 | A1 * | 2/2016 | Beauregard | ............. | H04L 67/12 700/286 |
| 2016/0197822 | A1 * | 7/2016 | Huang | .................. | H04L 47/125 370/218 |
| 2016/0205224 | A1 * | 7/2016 | Chini | .................... | H04W 84/04 455/422.1 |
| 2016/0337852 | A1 * | 11/2016 | Timariu | .................. | H04L 65/65 |
| 2016/0381219 | A1 * | 12/2016 | Hodge | ................. | H04M 15/854 726/4 |
| 2017/0070507 | A1 * | 3/2017 | Leconte | .................. | H04L 69/08 |
| 2017/0163444 | A1 * | 6/2017 | McLaughlin | ........... | H04L 63/02 |
| 2017/0187620 | A1 * | 6/2017 | Kielhofner | .............. | H04L 69/16 |
| 2017/0311224 | A1 * | 10/2017 | Wang | .................. | H04L 61/2528 |
| 2018/0351763 | A1 * | 12/2018 | Ock | ..................... | H04L 12/2825 |
| 2021/0229894 | A1 * | 7/2021 | Corsini | .............. | B65D 81/3853 |
| 2021/0309212 | A1 * | 10/2021 | Sonalker | ............. | H04W 4/021 |
| 2021/0309213 | A1 * | 10/2021 | Sonalker | ............ | B62D 15/0285 |

OTHER PUBLICATIONS

International Search Report from PCT Application No. PCT/EP2016/002141, dated Mar. 9, 2017.

* cited by examiner

DEVICE AND METHOD FOR CONNECTING A PRODUCTION DEVICE TO A NETWORK

BACKGROUND

The present invention relates to an apparatus for connecting a data-processing and/or data-generating production apparatus, in particular an apparatus for processing value documents, with a network, to a system having such a connection apparatus and to a data-processing and/or data-generating production apparatus connected therewith, as well as to a method for updating such a system.

In this context, value documents are understood to mean sheet-shaped objects, which represent for example a monetary value or an authorization and thus shall not be manufacturable at will by unauthorized persons. They hence have features that are not simple to manufacture, in particular to copy, whose presence is an indication of authenticity, i.e. manufacture by an authorized body. Important examples of such value documents are chip cards, coupons, vouchers, checks and in particular bank notes.

In the course of their manufacture and use value documents are subjected to many checks, for example with respect to their manufacture quality or print quality, their state after use and their authenticity.

Due to the immense number of value documents, in particular bank notes, for processing such value documents, in particular for checking, there are used value-document processing apparatuses for a largely automatic processing of value documents. Processing is understood within the context of the present invention in particular to be the accepting, outputting, checking, sorting according to specified criteria, and the destruction of value documents as well as the precursors of value documents during their manufacture. Fast value-document processing apparatuses partially process value documents at very high speeds of more than 30 value documents per second. The value documents are often present in stacks and must be singled, so as to be then transported first to corresponding sensors for the capture of specified physical properties by means of sensors. After the capture of the properties during the transport the data captured by the sensors can be processed forming a sorting class. This is used by a value document transport system to feed a value document to an output region assigned to the ascertained sorting class, where applicable also to an apparatus for the destruction of bank notes. The mentioned processes must be carried out in real time, because a single value document cannot be stopped during the processing thereof. The sensor means normally necessary for controlling the singling, transport, capture of the properties by the sensors, forming of sorting classes and subsequent transport, capturing physical value-document properties for checking, the high transport speed and the requirements on the feeding to the output regions is thus very complex, also but not only caused by the real-time requirements; the software used therefor is accordingly complex. From this point of view, updatings of the software should be effected as rarely as possible, because such updatings always are an intervention in a very complex system. Possible utilization times without updating could then be, for example, more than 10 years.

The results of the processing of value documents are to be captured frequently, for which a connection of the value-document processing apparatus with a network of the operator of the value-document processing apparatus would be desirable, in order to be able to transfer the results to suitable data processing devices of the operator. However, this requirement is accompanied by at least two difficulties. On the one hand, the data transfer methods in networks change quickly compared to the above-mentioned utilization period, in particular with respect to the software. This would entail a corresponding updating of the software. On the other hand, with such connections into a network attacks on the data and/or the software of the value-document processing apparatus are enabled, if the software has security holes. Such security holes, however, can never be excluded when commercial operating systems are used.

The integration of a value-document processing apparatus into an operator's network is hence not readily possible and would require compromises when installing and modernizing the network.

SUMMARY

Hence, the invention is based on the object of proposing means by means of which an integration of a production apparatus, in particular value-document processing apparatus, into a network is facilitated, without having to perform frequent updatings of the value-document processing apparatus. Further, a corresponding method is to be proposed.

The object is achieved by an apparatus having the features of claim 1 and in particular by an apparatus for connecting a data-processing and/or data-generating production apparatus with a network, preferably a data processing device, for example a server, via the network, comprising a memory,
at least one processor which can access the memory,
a first network interface to be connected with the network,
a second network interface to be connected with the production apparatus,
a computer program's program code stored in the memory for execution by the at least one processor, upon whose execution by the at least one processor data packets received at the second network interface via a second protocol are forwarded to the first network interface and there are sent via a first protocol into the network, in particular to the data processing device, for example the server, and/or upon whose execution data packets received at the first network interface via a first protocol are forwarded to the second network interface and there are sent via a second protocol to the production apparatus,
wherein the program code further comprises program code upon whose execution the at least one processor applies a packet filter to the data packets on the way between the network interfaces.

The object is further achieved by a method having the features of claim 15 and in particular a method for connecting a production apparatus having a network interface with a network, in which a connection apparatus according to the invention is used and the network interface of the production apparatus is connected with the second network interface of the connection apparatus.

Object of the invention is hence further a system having the features of claim 12, and in particular a system with a data-processing and/or data-generating production apparatus which has a network interface, and an apparatus according to the invention connected with this network interface via a data connection. The production apparatus is preferably configured to send and/or to receive data via the network interface thereof. Particularly preferably, the production apparatus is configured to send and/or to receive data via the network interface using the second protocol.

The data-processing and/or data-generating production apparatus can preferably be an apparatus which is no pure data processing device. In particular it can be infrastructure apparatuses, manufacturing plants or parts thereof.

Particularly preferably, the production apparatus can be an apparatus for processing value documents, for example for checking, sorting, banding and/or packing or destroying value documents, such as for example bank notes.

The apparatus is configured for connecting a data-processing and/or data-generating production apparatus with a network. In the following, for simplicity's sake, it is hence also designated as a connection apparatus. The network can be, for example, a network of an operator of the value-document processing apparatus, preferably a LAN. Preferably, the apparatus is configured such that a data connection between a specified value-document processing apparatus or a value-document processing apparatus of a specified type and a specified network or a network of a specified type is usable.

The apparatus comprises a memory, preferably a non-volatile memory, and at least one processor which has access to the memory and for this purpose is connected with this via at least one signal connection. In this memory there is stored in particular a computer program's program code, which are executable by means of the at least one processor. Additionally, there can be provided a volatile working memory which is usable by the at least one processor and for this purpose is connected with this via further signal connections.

The computer program or the program code may comprise instructions executable by the processor and configuration data which are used upon execution of the instructions.

For connection with the value-document processing apparatus, on the one hand, and connection with the network, on the other hand, in each case for the transfer of data, the first and the second network interfaces are provided. These can respectively comprise as a hardware component a network adapter or a network card, and as a software component a respective operating software, i.e. drivers, which can be or are formed by program code parts or instructions of the computer program in the memory or can represent components of the operating system. The network adapters or network cards are respectively connected via signal connections with the at least one processor which also executes the software component and thus operates the network adapters or network cards. The network interfaces can preferably be Ethernet interfaces.

The apparatus may have further components, as they are typical for simple data processing apparatuses.

The packet filter is preferably designed such that, on the one hand, it filters data packets coming in from the network before they are forwarded, where applicable, i.e. in dependence on the result of the filtering, to the second network interface; on the other hand it is designed such that it filters data packets to be transferred to the network. In the apparatus, the program code comprises for this purpose program code upon whose execution the at least one processor applies the packet filter to the data packets, preferably immediately before sending via the first network interface or immediately after receiving by the first network interface. "Immediately" is understood here to mean that the packet filter is applied before sending via the respectively other network interface.

A packet filter is understood to mean software or program code given by instructions and configuration parameters, which upon execution by the processor checks the headers of packets to come in and to be filtered and decides on the further destiny of the entire packet. In particular, packets can be discarded or forwarded depending on the result of the check of the respective header. Basically, the packet filter can be chosen arbitrarily, as long as it satisfies the desired function. Preferably, in the apparatus the packet filter is a packet filter which works at least on the OSI layer 2, i.e. for filtering packets uses information on layers higher than 2, particularly preferably IP and/or TCP header.

The apparatus is so configured that upon a transfer of data between the first and the second network interface, i.e. of data received via the first network interface and sent via the second network interface or of data received via the second network interface and sent via the first network interface, at the network interfaces there are used different protocols for the transfer. The protocol used for the transfer via the second network interface, the second protocol, can in particular be a protocol which is given by the protocol used or usable for transfer by the production apparatus connected therewith. Protocols in this context are understood to be protocols on layers above the 2nd layer in the OSI model.

In a preferred embodiment of the apparatus, the first protocol is preferably a protocol having encryption. For example, sftp or https can be used. In this way, a secured transfer of data into the network is possible.

Further preferably, in the apparatus the first and second protocol can be different. This has the advantage that for the transfer into the network there can be used a protocol more modern and current than for the transfer from the or to the production apparatus which does not need to be arranged for using the protocol. In particular, for the transfer at the first network interface a protocol with encryption can be used, without the production apparatus needing to have the possibility to carry out a data transfer with encryption via a protocol; hence, the second protocol can be a protocol without encryption, for example ftp or http.

It may be necessary to transfer large data volumes from the production apparatus into the network. In the apparatus, the program code can preferably comprise program code upon whose execution the setting up of a data connection via the second network interface, i.e. between the production apparatus and the apparatus, is monitored, and upon recognition of such a setting up a data connection via the first network interface, i.e. between the apparatus and the network and/or a data processing device, for example a server in the network, is set up. This has the advantage that the data connection into the network is ready for operation earlier.

Particularly preferably, in the apparatus the program code can comprise program code upon whose execution the transfer of data, which are transferred in a file from the production apparatus to the apparatus, into the network, for example to the data processing device, for example to the server, also can begin when the file has not yet been completely transferred via the second network interface to the apparatus. In particular, it is not necessary to temporarily store the file. This has the advantage that the requirements regarding the size of the memory in the apparatus are reduced.

Further, the apparatus can have a third network interface for connection with a further data-processing and/or data-generating production apparatus, which is connected via a signal connection with the at least one processor. In the apparatus, the program code may then comprise program code upon whose execution data packets received at the third network interface via a third protocol are forwarded to the first network interface and there are sent via a first protocol into the network, for example the data processing device, for example the server therein, and/or upon whose execution data packets received at the first network interface via a first protocol are forwarded to the third network interface and there are sent via the third protocol to the further production apparatus, and/or upon whose execution data are transported between the second and the third network interface. Preferably, the third network interface is also an Ethernet interface.

In the apparatus, the program code can then comprise program code upon whose execution processes with respect to the first and third network interface are executed, which correspond to those with respect to the first and second network interface, whereby the packet filter may be configured differently and the first and third protocol may be chosen differently than the first and second protocol. In particular, the program code can comprise program code upon whose execution the at least one processor applies the packet filter also to the data packets on the way between the first and third network interfaces. The first and the third protocol do not need to be equal, in particular the first protocol can be encrypted, while the third one can be unencrypted.

Further, the program code can then comprise program code upon whose execution data received via the second network interface are sent via the third network interface and/or in which the program code comprises program code upon whose execution data received via the third network interface are sent via the second network interface. The protocol used for this can here differ from the first, second and third protocols. However, it is also possible that at the second network interface there is used a protocol different from that used at the third network interface. According to a first variant, the program code comprises program code upon whose execution in an exchange of data via the two network interfaces no package filtering is carried out. However, according to a second variant it is also possible that the program code comprises program code upon whose execution by the at least one processor the packet filter is also applied to the data traffic between the second and third network interface. This must then be configured accordingly.

Preferably, in the apparatus there are stored data which relate to authentication and/or authorization and/or signing and/or details of the network in the memory. This has the advantage that these data are locally available. The details of the network here do not comprise the addresses of specified data processing devices connected with the network, for example servers, to which the production device sends data. Preferably, however, these are also stored in the apparatus.

Particularly preferably, in the apparatus the program code comprises program code or the program code is given such that with the execution thereof the at least one processor reads data which is used for authentication and/or authorization and/or signing, and/or details of the network necessary for setting up a data connection to the network and/or for filtering data which are transferred into the network or are transferred therefrom, only from the memory of the apparatus and/or receives them only from the network. This has the advantage that it is sufficient to store these data only in the apparatus, so that it is not necessary to effect changes in the production apparatus or the data thereof, in particular upon changes in the network. The details of the network here do not comprise the addresses of specified data processing devices connected therewith, for example servers, to which the production device sends data. Preferably, these are likewise stored in the apparatus. In particular the addresses of data processing devices, for example of a server, of the network can then be stored solely in the apparatus, and the instructions can comprise instructions upon whose execution for a data transfer from the production device to the data processing device the target address of the data processing device is read from the memory of the apparatus.

Further, the apparatus may preferably have a TPM (Trusted Platform Module), data relating to authentication and/or authorization and/or signing and/or details of the production apparatus being stored in the memory or the TPM. A "Trusted Platform Module" (TPM) is here a chip according to the specification of the Trusted Computing Group which expands a computer or similar devices with basic security functions.

Preferably, the apparatus can further have a maintenance interface. The program code then comprises program code upon whose execution by the processor configuration data of the apparatus can be changed via the maintenance interface. The maintenance interface can be, for example, a USB interface or particularly preferably a network interface. To the interface there can then be attached a maintenance computer, by means of which an access to the software and/or the configuration data is possible via the maintenance interface. This allows the configuration data of the apparatus to be easily changed or the software to be easily updated.

Preferably, the system of the invention can have at least one further data-processing and/or data-generating production apparatus having a network interface, and a further apparatus of the invention, wherein the further production apparatus is connected with the network only by means of the further apparatus, and preferably the network interface of the further production device is connected only with the second network interface of the further apparatus. Preferably, the production devices work independently of each other insofar that a second one of the production devices does not use the results of the work of a first one of the production devices. The use of respectively one connection apparatus for one production apparatus has the advantage that a simple and clear configuration of the connection apparatuses is possible, and in particular also the case of differing production apparatuses can be easily handled.

In the system of the invention the production apparatus or the production apparatuses may preferably comprise respectively at least one housing which encloses the production apparatus. The signal connection between the apparatus and the production apparatus, preferably the second network interface of the apparatus and the network interface of the production apparatus, then extends within the housing. Particularly preferably, the apparatus can be disposed in the housing. In the method for connecting the production apparatus it is preferred that the production apparatus comprises a housing, in which at least one port of the network interface is disposed, and that the connection apparatus is disposed in the housing and the second network interface is connected with the network interface of the production apparatus, the ports of the network interfaces being connected with each other by means of a signal connection, so that the ports and preferably the signal connection extend particularly preferably within the housing. Here, the housing is constituted such that it prevents an unauthorized access at least to the ports of the network interfaces. Locking elements of the apparatus, for example doors or flaps or the like for this purpose can be secured, for example, by locks or may, controlled by the production apparatus, only to inputs of an authorized user. This has the advantage that it is prevented that the signal connection between the apparatus and the production apparatus can be replaced simply with another signal connection, by means of which an unsecured access to the production apparatus is possible via the network interface thereof. The signal connection in this context is understood to be such, that it comprises a physical connection, for example a LAN cable.

Further subject matter of the present invention is a method for updating a system of the invention, in which, preferably upon alterations in the network, only configuration data and/or program code of the data transfer apparatus are changed, or in which, preferably in reaction to a newly recognized possibility of attacking the system or its data transfer apparatus, only the program code and/or the configuration data of the data transfer apparatus are changed or only the data transfer apparatus is exchanged. In the case of an exchange of the data transfer apparatus, this is exchanged with a data processing apparatus which preferably has the features of a data processing apparatus of the invention. These possibilities of updating avoid any changes in the production apparatus.

BRIEF DESCRIPTION OF THE DRAWINGS

The invention will hereinafter be explained further by way of example with reference to the drawings. There are shown.

DETAILED DESCRIPTION OF VARIOUS EMBODIMENTS

Figure 1:
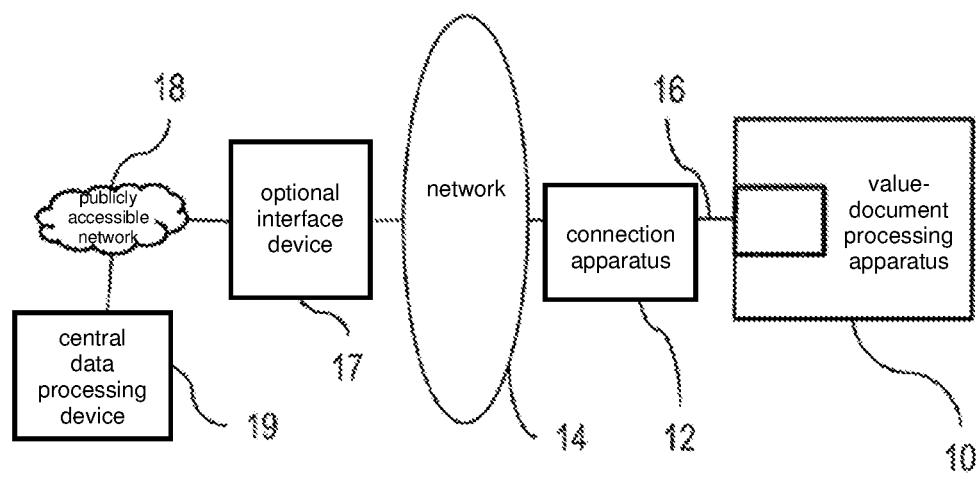
FIG. 1 a schematic view of a system for processing value documents and a network.

In FIG. 1, a system for processing value documents, in the example bank notes, comprises a value-document processing apparatus 10, in the example an apparatus for checking and sorting bank notes, a connection apparatus 12 and a network 14, in the example a LAN of an operator of the system, in the following designated as an operator's network. The value-document processing apparatus 10 and the connection apparatus 12 are connected with each other via exactly one data connection 16, in the example a signal connection in the form of a network cable. The connection apparatus 12 further is connected with the network 14 for the transfer of data. Further apparatuses, not shown in FIG. 1, of the operator can be connected with the network 14. The system as such represents a system with a data-processing and/or data-generating production apparatus and a connection apparatus connected therewith. In this embodiment example, the network 14 is connected via an optional interface device 17 with a publicly accessible network 18, for example the Internet; in other embodiment examples the interface device can have a firewall. Via this, a connection to a central data processing device 19, for example a server, of the operator, can be set up, for example at another place in order to transfer data there or to receive data therefrom. In other embodiment examples, however, this need not necessarily be the case. The value-document processing apparatus 10 is thus connected only via the connection apparatus 12 and the data connection 16 thereto with the operator's network 14.

Figure 2:
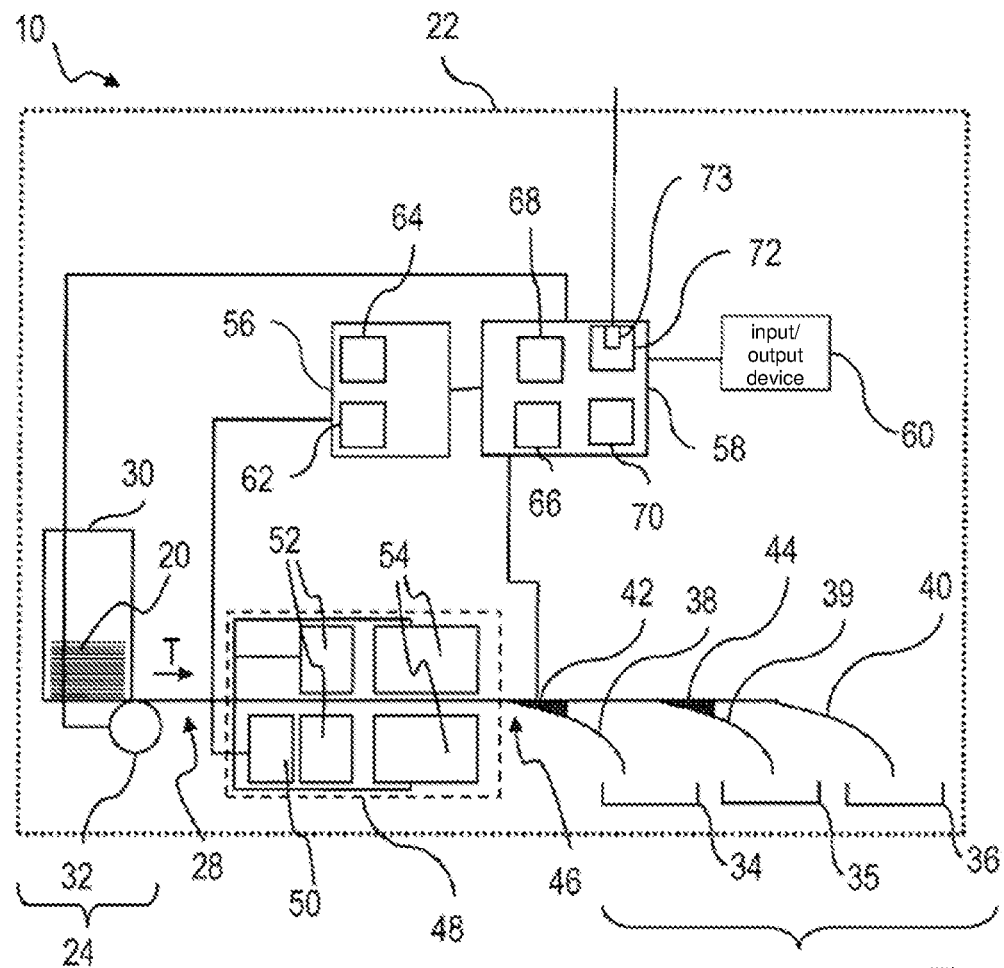
FIG. 2 a schematic representation of a production apparatus in the form of a value-document processing apparatus of the system in FIG. 1, FIG. 3 a schematic representation of a connection apparatus in FIG. 1, FIG. 4 a schematic representation of the value-document processing apparatus of the system in FIG. 2 after the connection with the network by means of the connection apparatus in FIG. 3, FIG. 5 a schematic representation of a part of the system in FIG. 1, with the value-document processing apparatus, the connection apparatus and a maintenance computer, FIG. 6 a schematic representation of a connection apparatus with a TPM, and FIG. 7 a schematic representation of a system modified compared to FIG. 1, which has two value-document processing apparatuses which respectively are connected via a connection apparatus with the network.

The value-document processing apparatus 10 in FIG. 2, in the example an apparatus for processing value documents 20 in the form of bank notes, is configured for sorting value documents 20 in dependence on the recognition of the authenticity and of the state of processed value documents in real time. The hereinafter described components of the apparatus 10 are arranged in a housing 22 (only shown schematically) of the apparatus 10 or held on said housing, unless they are designated as external.

The value-document processing apparatus 10 has a feeding device 24 for feeding value documents 20, an output device 26 for receiving processed, i.e. sorted, value documents, and a transport device 28 for transporting singled value documents from the feeding device 24 to the output device 26.

The feeding device 24 comprises, in this example, an input pocket 30 for a value-document stack and a singler 32 for singling value documents out of the value-document stack in the input pocket 30 and for feeding the singled value documents to the transport device 28.

The output device 26 has, in the example, three output portions 34, 35 and 36 into which processed value documents can be sorted, sorted according to the result of the processing. In the example, each of the portions comprises a stack pocket and a stacking wheel (not shown) by means of which fed value documents can be deposited in the respective stack pocket. In other embodiment examples one of the output portions may be replaced by a device for destroying bank notes.

The transport device 28 has at least two, in this example three, branches 38, 39 and 40 at whose ends one of the output portions 34 or 35 or 36 is arranged in each case, and, at the branching points, gates 42 and 44, controllable by positioning signals, by means of which value documents are feedable to the branches 38 to 40 and thus to the output portions 34 to 36 in dependence on positioning signals.

On a transport path 46, defined by the transport device 28, between the feeding device 24, in this example more precisely the singler 32, and the first gate 42 after the singler 32 in the transport direction, is arranged a sensor device 48 which measures physical properties of value documents while the value documents are being transported past and forms sensor signals rendering the measuring results. In this example, the sensor device 48 has three sensors, namely, an optical remission sensor 50 which captures a remission color image and a remission IR image of the value document, an optical transmission sensor 52 which captures a transmission color image and a transmission IR image of the value document, and a transmission ultrasonic sensor 54 which captures or measures as an ultrasound property the ultrasound transmission of the value document in a spatially resolved manner, and will hereinafter only be designated as an ultrasonic sensor for simplicity's sake. The sensor signals formed by the sensors correspond to measuring data or raw data of the sensors which, depending on the sensor, may have already been subjected to a correction, for example in dependence on calibrating data and/or noise properties.

For evaluating the signals of the sensors, the value-document processing apparatus 10 has an evaluation device 56 which is connected via signal connections with the sensor device 48; it evaluates sensor signals of the sensor device 48, which this captures for a value document and which signals represent at least one preferably physical property of the respective value document, and ascertains from these for the respective value document a sorting class and outputs a sorting signal representing the sorting class.

For controlling the value-document processing apparatus 10, this further holds a control device 58 which is connected via signal connections, with, inter alia, the evaluation device 56, the feeding device 24, in particular the singler 32, the output device 26 and the transport device 28, in particular the gates 42 and 44. The control device 58 controls, inter alia, the transport device to 28 in dependence on sorting signals of the evaluation device 56.

For capturing and displaying operating data and, where applicable, outputting certain operation data, the value-document processing apparatus 10 has an input/output device 60 which is connected via signal connections with the control device 48. The input/output device 60 is realized in this example by a touch-sensitive display device ("touch screen"). In other embodiment examples it may comprise, for example, a keyboard and a display device, for example an LCD display.

The evaluation device 56 has, besides corresponding data interfaces (not shown in the Figures) for the sensor device 48 or its sensors, at least one processor 62 and a memory 64 connected with the at least one processor 62, in which program code for an operating system and at least one computer program with program code is stored. Upon the execution of the operating system and of the computer program, the evaluation device 56 or its at least one processor 62 captures the sensor signals or measurement values of the sensor device 48 for a respective value document and evaluates these in particular for ascertaining an authenticity class and/or a state class of a processed value document; in so doing, it ascertains in dependence on the sensor signals for the respective value document one of several specified sorting classes and generates a sorting signal respectively associated with said classes. The sorting classes are given in dependence on the authenticity and state classes.

The control device 58 has a data interface (not shown in the Figures) for connection with the evaluation device 56, with which it is connected via a data connection. Further, it has at least one processor 66 and a memory 68 connected with the at least one processor 66, in which memory program code for an operating system and for at least one computer program with program code is stored; the program code comprises preferably configuration data which are used for or upon execution of the program code. Further, a memory device 70 for operation data and/or measurement data is provided. Upon execution of the at least one computer program or its program codes (in connection with the operating system or the program codes thereof) the evaluation device 56 or the processor 66 controls, inter alia in dependence on sorting signals of the evaluation device 56, the transport device 46, in particular the gates thereof, in such a way that a respective value document, for which a sorting class corresponding to the sorting signal was ascertained, is transported into an output portion assigned to this sorting class.

Additionally, the control device 58 stores data captured upon execution of the program code during operation, for example measurement data and/or sorting results, in the memory device 70.

Further, the control device 58 controls the input/output device 60, inter alia, to display operating data and captures via said device operating data which correspond to an input of an operator person.

The control device 58 further possesses a network interface 72 via which it is connectable with a network, in the example by means of TCP/IP. The network interface is an Ethernet interface. It has a port 73 for a network cable, in the example a port socket, and is disposed such that the latter is disposed within the housing 22 such that it is not accessible from outside the housing such that a network cable can be removed from the port or be connected therewith from outside. The program code in the memory 68 comprises program code for operating the network interface 72. In this embodiment example, the network interface 72 is connected with a corresponding network interface of the connection apparatus 12. Upon execution of the program code in the memory 68, the control device 58 monitors, for example, the occurrence of a specified event, for example the expiration of a specified time interval or the capture of a specified user input, and transfers upon occurrence of the event the data stored in the memory device to 70 via the network interface 72 using a first transfer protocol, in the example ftp for which the program code includes respective instructions. The data are transferred into the operator's network 14 and from there via the interface device 17 and the Internet 18 to the data processing apparatus 19.

For configuring the operating system, in particular also with respect to the network interface 72, in the example an Ethernet card, configuration data are stored in the memory 68, which the operating system and, where applicable, other program code accesses during execution.

The housing 22 has openings by which access to the interior of the apparatus is made possible. However, these are protected, if they do not only serve for the designated use, against unauthorized opening, in the example by means of locks. The network interface 72 is in particular disposed such that from outside of the closed housing no access to the port 73 for connecting connections to said port or removing a connection therefrom is possible.

During operation, value documents are singled out of the feeding device 24 and transported past the sensor device 48 or therethrough. The sensor device 48 captures or measures physical properties of the value document respectively transported past or through it and forms sensor signals or measurement data which describe the measurement values for the physical properties. The evaluation device 56 classifies the value document in real time in dependence on the sensor signals of the sensor device 48 for a value document and on classification parameters stored in the evaluation device 56 into one of specified sorting classes, in the example authenticity and/or state classes. The association with one of the specified sorting classes, or the classification, is effected here in dependence on at least one authenticity criterion specified therefor. After the ascertaining of the respective sorting class the evaluation device 56 emits a corresponding signal to the control device 58. Said control device receives the signal and controls by emitting actuating signals the transport device 28, here more precisely the gates 42 or 44, such that the value document is outputted, in accordance with its class ascertained upon the classification into an output portion of the output device 26, said portion being associated with the class.

The singling of the value documents and their transport can be effected, in the case of powerful value-document processing apparatuses, at a speed of up to 44 bank notes/second, so that all components of the apparatus, in particular also the evaluation device 56 and the control device 58, must work very precise, fast and in a good mutual coordination in real time. In the case of a speed of 40 bank notes/second the evaluation of the measurement data for a value document must be terminated after 0.025 seconds at the latest. Obviously, an error-free, frequent updating of even only one component, in particular of the software, is very expensive and, where applicable, also error-prone.

Figure 3:
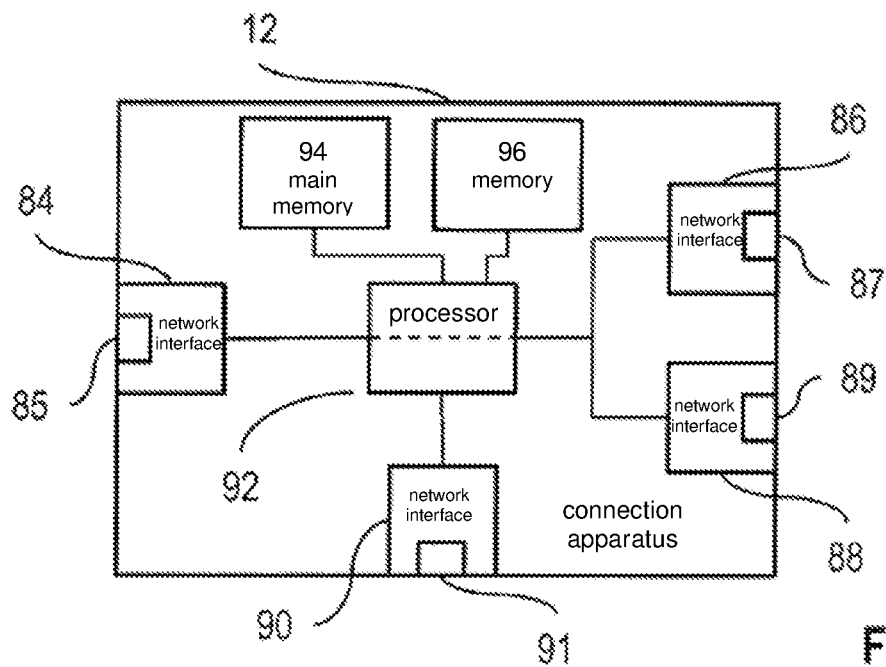
Figure 4:
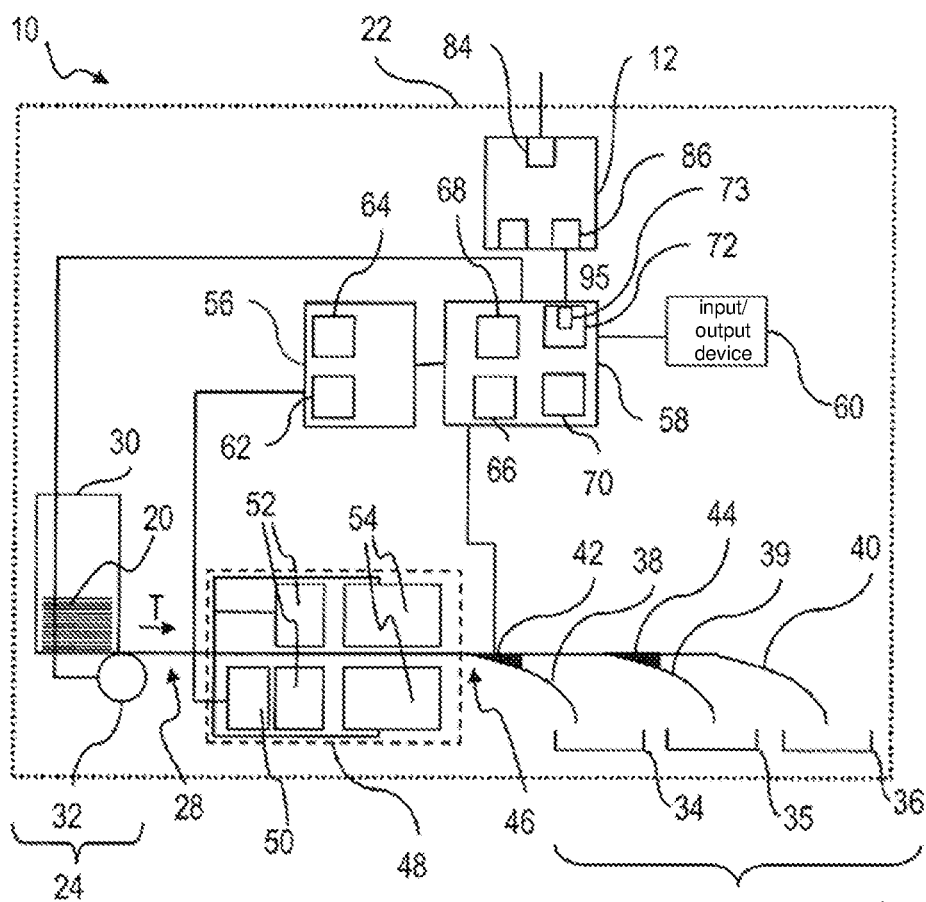

The connection apparatus 12 very schematically illustrated in FIG. 3 comprises in an optional housing (not shown in detail) on a circuit board four network interfaces 84 to 90, a processor 92 connected therewith via data lines, a main memory 94 which the processor 92 can access, and a memory 96 which has stored therein program code with instructions of software still to be described; in this embodiment example the memory 96 comprises a non-volatile memory, in particular a flash memory card. On the circuit board there can be disposed still further components which are provided for the cooperation of the network interfaces 84 to 90, the processor 92, the main memory 94 and the memory 96. The network interfaces 84 to 90 in the example are Ethernet interfaces and have ports, here port sockets 85, 87, 89 or 91, for a network cable.

In the memory 96 there is stored as a software program code which can be executed or is executed by the processor 92. Parts of the program code are, inter alia, an operating system of the connection apparatus 12. The software also comprises configuration data which are stored in the memory 96 and which the processor 92 and, where applicable, further components of the connection apparatus 12 use upon execution of the program code.

The network interface 84 is provided for the connection with the operator's network 14, the network interfaces 86 and 88 for the connection with value-document processing apparatuses, and the network interface 90 with an optional service computer, for example a notebook, which is not permanently connected with the connection apparatus. The operating system is configured accordingly by corresponding entries in the configuration data. In the example, the network interface 86 is connected with the value document processing device 10, more precisely the network interface 72 via the data line 16.

Furthermore, the program code comprises program code with instructions and configuration data for a firewall in the form of a packet filter upon whose execution by the processor 92 a packet filter is provided by means of which the network traffic via the network interfaces 84 to 90 can be filtered or controlled. The stored configuration data comprise, inter alia, data for filter rules which include entries as to whether and how data packets coming via a respective one of the network interfaces are forwarded. The packet filter works on layer 2 of the OSI model and filters data packets at least on the basis of data of headers of the data packets in the layers above the 2nd layer of the OSI model.

As shown in FIG. 3, the connection device 12 is disposed in the housing 22 such and the connection between the network interface 72 of the value-document processing apparatus 10 and the second network interface 86 of the connection apparatus 12, in the example a connection cable 95, more precisely a LAN cable, is disposed such that at least the ports of the mentioned network interfaces and the connection cable 95 are disposed completely within the housing 12, so that without an opening of the housing 22 no access to the ports and the connection cable 95 for being able to remove the connection cable from the ports is possible. An exchange of network cables and thus the arrangement of a direct data connection with a foreign system can thus be readily made more difficult or even be prevented.

The value-document processing apparatus 10 and the connection apparatus 12 respectively need configuration data which are used upon execution of software of the apparatuses. These configuration data are to be regarded as part of the program code.

Since the value-document processing apparatus 10 can access the operator's network 14 or devices connected therewith only via the connection apparatus 12, the configuration data of the value-document processing apparatus 10 do not need to contain any further data, except for an IP address of the connection apparatus 12, which relate to devices in the operator's network 14 or to devices beyond the operator's network which are connected with the operator's network. Changes in the operator's network or networks connected therewith need not entail any changes in the value-document processing apparatus 10.

A direct access to the value-document processing apparatus 10 via the operator's network 14 is not possible, but only an access via the connection apparatus 12. Data for a direct access to the value-document processing apparatus 10, for example the IP address thereof or the like, hence do not need to be known and in particular not to be stored in the operator's network 14. As the value-document processing apparatus 10 has no further network interfaces for connection with a network, an access to this via another interface is not possible.

Hence, the configuration data of the value-document processing apparatus 10 comprise only the IP address of the connection apparatus 12.

The configuration data of the connection apparatus 12 are more extensive and comprise, inter alia, the IP addresses of the value-document processing apparatus 10 connected with one of the network interfaces 86 or 88, in the example with the network interface 86, and preferably at least one IP address in the operator's network 14, for example an IP address of the data processing device 19, in the example of the server 19. Preferably, with the IP address in the operator's network 14 there is associated also an identifier stored in the value-document processing apparatus 10 as a configuration parameter, for example an internal IP address for being used between the connection apparatus 12 and the value-document processing apparatus 10.

A communication from the value-document processing apparatus 10 to the device on the operator's network 14 or a data processing device connected with the operator's network, for example the server 19, can be effected as follows. The value-document processing apparatus 10 comprises program code and configuration parameters, upon whose execution upon setting up a connection to the device the internal IP address specified by the configuration parameters of the value-document processing apparatus 10, which identifies the device in the value-document processing apparatus 10, is used. The program code stored in the connection apparatus 12 includes instructions and configuration data, so that upon the execution of the instructions a setting up of a connection from the value-document processing apparatus 10 to the specified internal IP address is recognized and the internal IP address is replaced by the at least one IP address in the operator's network 14 or a network connected therewith, which address is included in the configuration data of the connection apparatus 12.

Further, the configuration data include configuration data for the firewall, in the example rules for the packet filter. In the example, the filter rules are chosen such that only TCP/IP connections via specified ports are made possible. These are chosen such that a data transport is made possible only via ports for which the connection apparatus 12 is configured.

In other embodiment examples the configuration data may additionally comprise data regarding the transfer protocols used, so that only these can be used. Updating the firewall or alterations with respect to the operator's network, for example the IP addresses or the transfer protocol used, thus entail changes for connection apparatus 12.

The connection apparatus 12, in particular the software thereof, is arranged such that it makes possible a data transfer between the operator's network 14 and the value-document processing apparatus 10, for example a data transfer from the value-document processing apparatus 10 via the connection apparatus 12 to at least one device in the operator's network 14, or vice versa, using equal or, in this embodiment example, different transfer protocols. The transfer protocols are those which relate to layers above the second layer in the OSI model, or above the TCP/IP network access layer (link layer).

The program code stored in the connection apparatus 12 includes for this purpose instructions upon whose execution data from the operator's network 14 are forwarded to the value-document processing apparatus 10 or from the value-document processing apparatus 10 into the operator's network 14, a first transfer protocol being used for the transfer of the data between the connection apparatus 12 and the value-document processing apparatus 10 and a second transfer protocol for the transfer of the data between the connection apparatus 12 and the operator's network 14. In this embodiment example, the first transfer protocol is specified by the value-document processing apparatus 10, in particular by the control device 58 or software thereof, which is connected with the respective network interface 86 or 88, in this case the network interface 86. In other embodiment examples, it can be defined by configuration data in the connection apparatus 12 which protocol is to be used for the connection into the network 12 or to a data processing device connected therewith, for example the server 19. Then the program code includes respective instructions, which for the transfer use a corresponding protocol in dependence on the configuration data.

The program code stored in the connection apparatus 12 includes in particular instructions for the transfer of data which were transferred via one of the network interfaces 86 and 88 for value-document processing apparatuses by means of a first transfer protocol, via the network interface 84 to the operator's network 14 by means of a second transfer protocol, or for the transfer of data which were transferred via the network interface 84 to the operator's network 14 by means of the second transfer protocol, via one of the network interfaces 86 and 88 for value-document processing apparatuses by means of the first transfer protocol.

In the example, the transfer protocols are transfer protocols for the transfer of files. In particular, the value-document processing apparatus 10 in the example is configured for sending or receiving data by means of ftp (file transfer protocol) via the network interface. More precisely, the first transfer protocol is thus ftp. The second transfer protocol is an encrypted protocol, in the example sftp (SSH File Transfer Protocol or Secure File Transfer Protocol).

The instructions of the program code of the connection apparatus 12 hence comprise instructions for an ftp server and for an sftp client.

An example of a data transfer from the value-document processing apparatus 10 into the operator's network 14 is illustrated very schematically in FIG.

The control device of the value-document processing apparatus 10 is configured for monitoring the occurrence of an event in or at the value-document processing apparatus 10, for example, a specified user input. Then first starting out from the value-document processing apparatus 10 a connection is set up from the value-document processing apparatus 10 to the connection apparatus 12 via one of the network interfaces 86 and 88, in the example 86, which is based on ftp. For this, the control device 68 of the value-document processing apparatus 10 has an ftp client by means of which a connection to the ftp server on connection apparatus 12 is set up.

The software of the connection apparatus 12 includes instructions upon whose execution it is monitored whether an ftp connection to a data processing device reachable via the network 14, in the example the server 19, is set up. If this is recognized, the ftp client of the connection apparatus 12 sets up a connection to the device via the network 14, which uses the second transfer protocol.

The software of the connection apparatus 12 includes instructions upon whose execution the reception of data packets via the network interface is monitored and upon reception of data with a specified data volume these data are transferred via the network interface via the second transfer protocol into the network 14 by means of the second transfer protocol.

Upon forwarding a file, in this embodiment example, a file will hence not necessarily be received completely from the connection apparatus 12 before it is forwarded. The forwarding, i.e. the sending, can already begin even when the file has not yet been received completely.

The transfer of the data into the network 14 is terminated, when all the data received via the respective network interface, here the interface 86, were forwarded.

The connections can be cut off afterwards.

Since the value-document processing apparatus 10 is not directly reachable from the operator's network 14 and in particular is not visible, a communication with said apparatus must be effected exclusively via the connection apparatus 12. Hence, in the user's network 14 only the IP address of the connection apparatus 12 needs to be known. In principle, this can be chosen arbitrarily.

Due to the possibility that between the connection apparatus 12 and the value-document processing apparatus 10 the first transfer protocol can be used and between the connection apparatus 12 and the operator's network 14 or a data processing apparatus therein a different transfer protocol, even old protocols, compared to the development in data processing, can be used as first transfer protocols, while to the operator's network 14 more modern protocols can be employed. This also may avoid software updatings of the value-document processing apparatus 10 which may become necessary on account of a modernization of the operator's network 14, because of the much easier and more robust updating of the connection apparatus 12.

Figure 5:
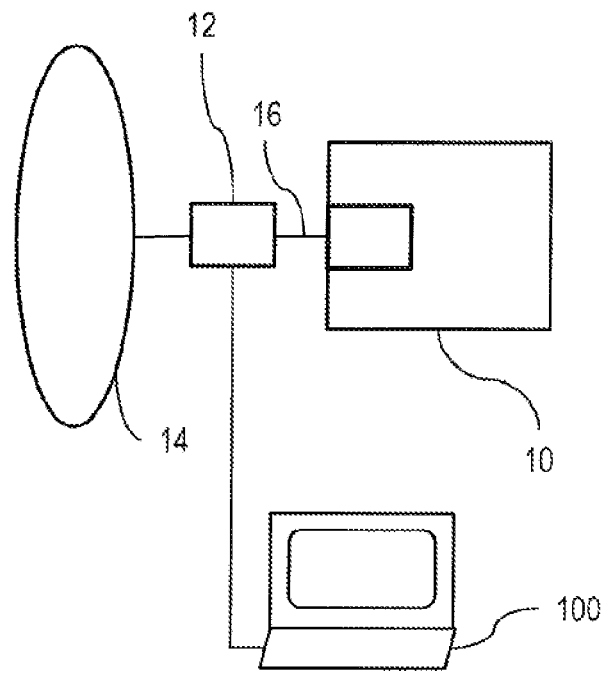
Figure 6:
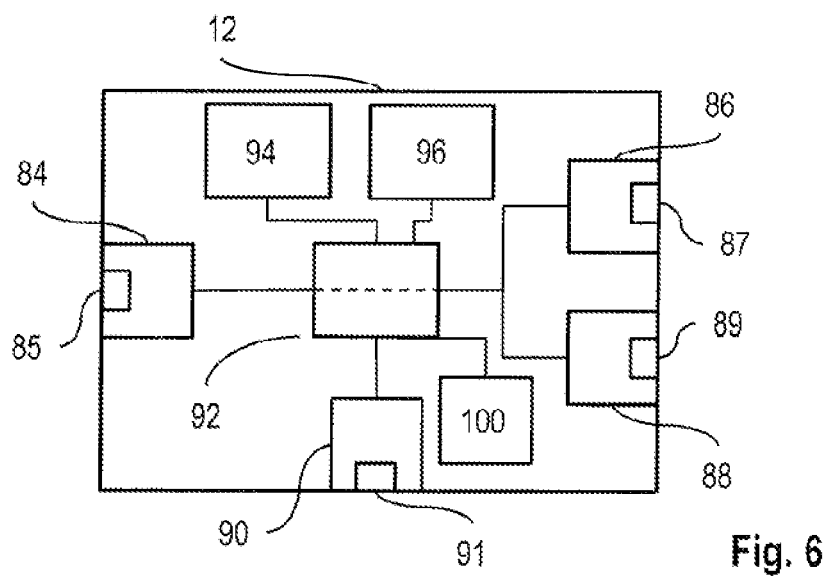

The program code also comprises program code upon whose execution by the processor it is possible to access the connection apparatus 12 with a maintenance computers 100 connected via the network interface 90, for example for altering the configuration data of the said apparatus. This is illustrated in FIG. 5, in which there is only shown the operator's network 14, the value-document processing apparatus 10 connected with said network via the connection apparatus 12 and connected with the latter via the data connection 16.

As from the operator's network 14 an access to the value-document processing apparatus 10 can only be effected via the connection apparatus 12, the value-document processing apparatus 10 is very well protected against attacks from the operator's network 14. Security updates of parts of the software of the value-document processing apparatus 10 are generally only necessary, when security holes are recognized in the software, which allow attacks on the data of the value-document processing apparatus or the function thereof. By shielding the value-document processing apparatus 10 such software updatings are not or very rarely necessary. Accordingly, the effort necessary for this is omitted and the possible risks for the error-free function of the value-document processing apparatus, which are connected with updating, can be drastically reduced.

The connection apparatus 12 can further an interface for a portable data carrier, for example a hard disk or a flash memory. In one embodiment, the software of the connection apparatus 12 can have instructions upon whose execution an access to a mobile data memory connected with the interface is possible and updatings can be read in and carried out. In other embodiments, the updating can be carried out only by software on the mobile data carrier.

Another method for updating the software of the connection apparatus 12 provides that the memory 96 of the connection apparatus 12, in the example a flash memory in the form of a card, is replaced by another memory.

If changes are to be made on the side of the network 14, which require a change of the hardware of the connection apparatus 12, in particular of the network interface 84, the connection apparatus 12 only needs to be replaced by a modified connection apparatus which has an accordingly modified network interface. The value-document processing apparatus 10 can remain unaltered here.

In other embodiment examples, there can also be provided an evaluation device separate from the control device and connected via interfaces to the sensors of the sensor device 48, on the one hand, and the control device 58, on the other hand. The evaluation device 56 is then configured for evaluating the sensor signals and delivers the respective result to the control device 58, which controls the transport device 28. The evaluation operations described in the following may then be carried out by the evaluation device alone.

In other embodiment examples, the memory 68 and the memory device 70 may be formed by a common storage.

In other embodiment examples, in the connection apparatus at least one of the network interfaces 86 and 88 can have a network cable firmly connected with the connection apparatus, for example soldered at one end thereto, for physically establishing the data connection, which cable is directly connectable with the value-document processing apparatus 10. Then the respective port can be omitted. Also in this way, an easy exchange of network cables will be made substantially more difficult.

In other embodiment examples, the connection apparatus 12 may comprise also a TPM 100 (Trusted Platform Module). The TPM 100 is connected with the processor 92 and is used by this in connection with authentication, signing and the management of keys. For this purpose, the program code of the connection apparatus comprises respective instructions. Configuration data which relate to authentication and/or authorization and/or signing and/or details of the production apparatus can be stored in the memory or the TPM, and be used by the TPM. Otherwise, the connection apparatus is configured like the above-described connection apparatus.

Figure 7:
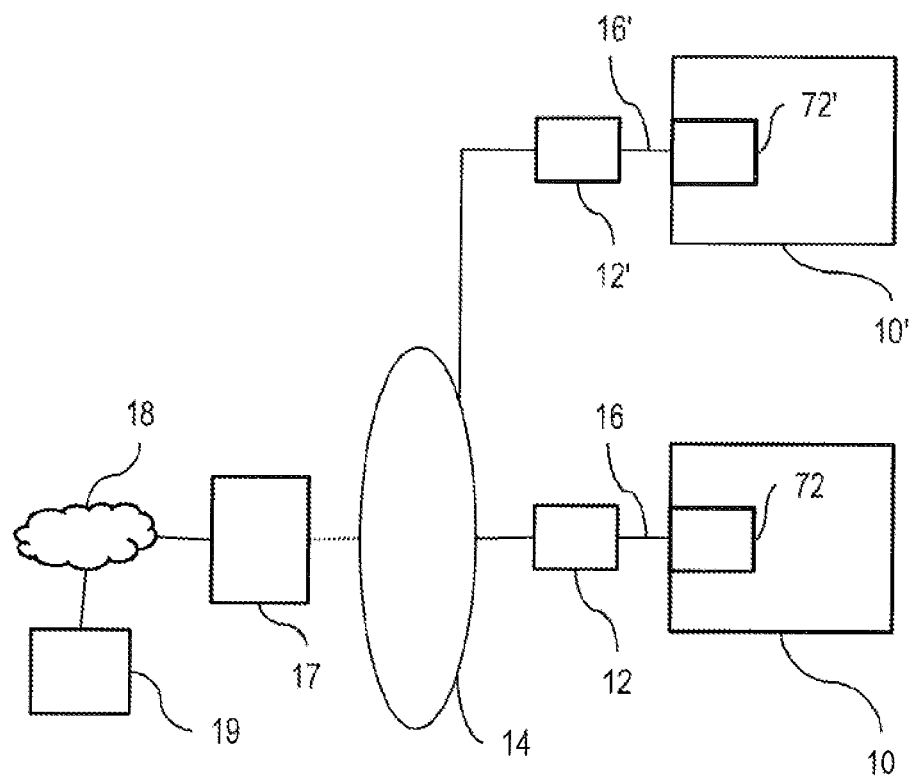

An embodiment example in FIG. 7 differs from the embodiment example in FIG. 1 in that a second value-document processing apparatus 10' is connected with the network 14. For each of the value-document processing apparatuses 10 and 10' work', which in this embodiment example work independently of each other in the sense that the results of the processing of value documents by the one apparatus are used by the other apparatus to process the processed value documents or a part of the processed value documents, a connection apparatus 12 or 12', respectively, is provided, by means of which the value-document processing apparatuses are connected with the network 14. In the example, the network interface 72' of the value-document processing apparatus 10' is connected via a signal connection 16' with the network interface 86 of the connection apparatus 12', whose first network interface in turn is connected with the network 14. The connection apparatuses 12, 12' here are equally configured, the configuration data being modified in accordance with the value-document processing apparatuses 10 and 10'.

The value-document processing apparatuses 10 and 10' here are equally constructed, corresponding to FIG. 2, in other embodiment examples this need not necessarily be the case, however.

The invention claimed is:

1. A system comprising:
   a production apparatus having a network interface, the production apparatus being a data-processing production apparatus and/or a data-generating production apparatus; and
   a connection apparatus connected to the production apparatus,
   wherein the connection apparatus is configured to connect the production apparatus with a network,
   wherein the connection apparatus includes:
      a memory,
      a processor with the memory, wherein the processor is configured to access the memory for reading and writing,
      a first network interface configured to be connected with the network,
      a second network interface configured to be connected with the production apparatus,
      a computer program code stored in the memory for execution by the processor,
      wherein the computer program code comprises instructions
         upon whose execution data packets received at the second network interface via a second protocol are forwarded to the first network interface and are sent via a first protocol into the network, and/or
         upon whose execution data packets received at the first network interface via a first protocol are forwarded to the second network interface and are sent via a second protocol to the production apparatus, and
      wherein the computer program code further comprises instructions upon whose execution the processor applies a packet filter to the data packets,
      wherein the packet filter is applied by the processor on the way of the data packets between the first network interface and the second network interface, and
   wherein the production apparatus is not visible from the network,
   wherein the production apparatus comprises at least one housing and the signal connection between the connection apparatus and the production apparatus extends completely within the housing and in which the connection apparatus is disposed in the housing, wherein the housing is constituted such that it prevents an unauthorized access at least to the ports of the network interfaces due to a locking element of the production apparatus which can be secured by a lock or by the production apparatus reacting to inputs of an authorized user, and wherein the program code stored in the connection apparatus includes instructions and configuration data, so that upon the execution of the instructions a setting up of a connection from the production apparatus to a specified internal IP address of the connection apparatus is recognized and the internal IP address is replaced by at least one IP address in the network, which at least one IP address is included in the configuration data of the connection apparatus.

2. The system according to claim 1, further comprising at least one further data-processing and/or data-generating production apparatus having a network interface, wherein the further production apparatus is connected with the network only by means of the further apparatus, and the network interface of the further production device is connected only with the second network interface of the further apparatus.

3. A method for updating a system according to claim 1, the method comprising:
changing only the configuration data and/or the computer program code of the connection apparatus upon an alteration in the network.

4. A method for updating a system according to claim 1, the method comprising:
changing only the computer program code and/or the configuration data of the connection apparatus or only the connection apparatus is exchanged in reaction to a newly recognized possibility of attacking the system or the connection apparatus.

5. The system according to claim 1, wherein the first protocol is different than the second protocol.

6. The system according to claim 1, wherein the first protocol is a protocol with encryption and the second protocol is without encryption.

7. The system according to claim 1, wherein the computer program code further comprises instructions
upon whose execution the setting up of a data connection via the second network interface is monitored, and
upon recognition of said setting up via the second network interface, a data connection is set up via the first network interface.

8. The system according to claim 7, wherein the computer program code further comprises instructions upon whose execution the transfer of data, which are transferred in a file from the production apparatus to the connection apparatus, into the network, when the file has not yet been completely transferred to the apparatus.

9. The system according to claim 1, further comprising a third network interface for connection with a further data-processing and/or data-generating production apparatus, which is connected via a signal connection with the processor, and
in which the computer program code comprises instructions
upon whose execution data packets received at the third network interface via a third protocol are forwarded to the first network interface and are sent via a first protocol into the network, and/or
upon whose execution data packets received at the first network interface via a first protocol are forwarded to the third network interface and are sent via the third protocol to a further production apparatus, and/or
upon whose execution data are transported between the second and the third network interface.

10. The system according to claim 9,
wherein the computer program code comprises instructions upon whose execution data received via the second network interface are sent via the third network interface, and/or
wherein the computer program code comprises program code upon whose execution data received via the third network interface are sent via the second network interface.

11. The system according to claim 1, further comprising a third network interface for connection with a further data-processing and/or data-generating production apparatus, which is connected via a signal connection with the processor, and
in which the computer program code comprises instructions
upon whose execution data packets received at the third network interface via a third protocol are forwarded to the first network interface and are sent via a first protocol into the network, and
upon whose execution data packets received at the first network interface via a first protocol are forwarded to the third network interface and are sent via the third protocol to a further production apparatus, and
upon whose execution data are transported between the second and the third network interface.

12. The system according to claim 11,
wherein the computer program code comprises instructions upon whose execution data received via the second network interface are sent via the third network interface, and
wherein the computer program code comprises program code upon whose execution data received via the third network interface are sent via the second network interface.

13. The system according to claim 1, further comprising a Trusted Platform Module (TPM), wherein data relating to authentication and/or authorization and/or signing and/or details of the production apparatus are stored in the memory or the TPM module.

14. The system according to claim 1, wherein data relating to authentication and/or authorization and/or signing and/or details of the network are stored in the memory.

15. The system according to claim 1, further comprising a Trusted Platform Module (TPM), wherein data relating to authentication and/or authorization and/or signing and/or details of the production apparatus are stored in the TPM module.

16. The system according to claim 1, further comprising a maintenance network interface, and
wherein the computer program code comprises instructions upon whose execution by the processor the configuration data of the connection apparatus can be changed.

17. The system according to claim 1, wherein the computer program code further comprises instructions upon whose execution the processor reads data which is used for authentication and/or authorization and/or signing, and/or details of the network necessary for setting up a data connection to the network and/or for filtering data which are transferred into the network or are transferred therefrom, only from the memory of the connection apparatus and/or receives them only from the network.

18. The system according to claim 1, wherein the computer program code further comprises instructions upon whose execution the processor reads data which is used for authentication and/or authorization and/or signing, and/or details of the network necessary for setting up a data connection to the network and/or for filtering data which are transferred into the network or are transferred therefrom, only from the memory of the connection apparatus and receives them only from the network.

19. A method for connecting a production apparatus having a network interface with a network, the production apparatus being a data-processing production apparatus and/or a data-generating production apparatus, the method comprising:
providing a connection apparatus, wherein the connection apparatus includes
a memory,
a processor with the memory, wherein the processor is configured to access the memory for reading and writing,
a first network interface configured to be connected with the network,
a second network interface configured to be connected with the production apparatus,
a computer program code stored in the memory for execution by the processor,
wherein the computer program code comprises instructions
upon whose execution data packets received at the second network interface via a second protocol are forwarded to the first network interface and are sent via a first protocol into the network, and/or
upon whose execution data packets received at the first network interface via a first protocol are forwarded to the second network interface and are sent via a second protocol to the production apparatus, and
wherein the computer program code further comprises instructions upon whose execution the processor applies a packet filter to the data packets, wherein the packet filter is applied by the processor on the way of the data packets between the first network interface and the second network interface; and
connecting the network interface of the production apparatus with the second network interface of the connection apparatus,
wherein the production apparatus is not visible from the network,
wherein the production apparatus comprises at least one housing and the signal connection between the connection apparatus and the production apparatus extends completely within the housing and in which the connection apparatus is disposed in the housing,
wherein the housing is constituted such that it prevents an unauthorized access at least to the ports of the network interfaces due to a locking element of the production apparatus which can be secured by a lock or by the production apparatus reacting to inputs of an authorized user, and
wherein the program code stored in the connection apparatus includes instructions and configuration data, so that upon the execution of the instructions a setting up of a connection from the production apparatus to a specified internal IP address of the connection apparatus is recognized and the internal IP address is replaced by at least one IP address in the network, which at least one IP address is included in the configuration data of the connection apparatus.

20. A system comprising:
a production apparatus having a network interface, the production apparatus being a data-processing production apparatus and/or a data-generating production apparatus; and
a connection apparatus connected to the production apparatus,
wherein the connection apparatus is configured to connect the production apparatus with a network,
wherein the connection apparatus includes:
a memory,
a processor with the memory, wherein the processor is configured to access the memory for reading and writing,
a first network interface configured to be connected with the network,
a second network interface configured to be connected with the production apparatus,
a computer program code stored in the memory for execution by the processor,
wherein the computer program code comprises instructions
upon whose execution data packets received at the second network interface via a second protocol are forwarded to the first network interface and are sent via a first protocol into the network, and/or
upon whose execution data packets received at the first network interface via a first protocol are forwarded to the second network interface and are sent via a second protocol to the production apparatus, and
wherein the computer program code further comprises instructions upon whose execution the processor applies a packet filter to the data packets,
wherein the packet filter is applied by the processor on the way of the data packets between the first network interface and the second network interface, and
wherein the production apparatus comprises at least one housing and the signal connection between the connection apparatus and the production apparatus extends completely within the housing and in which the connection apparatus is disposed in the housing,
wherein the housing is constituted such that it prevents an unauthorized access at least to the ports of the network interfaces due to a locking element of the production apparatus which can be secured by a lock or by the production apparatus reacting to inputs of an authorized user, and
wherein the program code stored in the connection apparatus includes instructions and configuration data, so that upon the execution of the instructions a setting up of a connection from the production apparatus to a specified internal IP address of the connection apparatus is recognized and the internal IP address is replaced by at least one IP address in the network, which at least one IP address is included in the configuration data of the connection apparatus.

* * * * *